United States Patent
Maes et al.

(10) Patent No.: US 7,201,982 B2
(45) Date of Patent: Apr. 10, 2007

(54) METHODS FOR FUEL CELL COOLANT SYSTEMS

(75) Inventors: Jean-Pierre Maes, Merelbeke (BE); Serge Lievens, Merelbeke (BE)

(73) Assignees: Texaco, Inc., San Ramon, CA (US); Texaco Development Corporation, San Ramon, CA (US)

( * ) Notice: Subject to any disclaimer, the term of this patent is extended or adjusted under 35 U.S.C. 154(b) by 49 days.

(21) Appl. No.: 10/492,745

(22) PCT Filed: Oct. 15, 2002

(86) PCT No.: PCT/EP02/11497

§ 371 (c)(1),
(2), (4) Date: Apr. 14, 2004

(87) PCT Pub. No.: WO03/033616

PCT Pub. Date: Apr. 24, 2003

(65) Prior Publication Data

US 2005/0051754 A1    Mar. 10, 2005

(30) Foreign Application Priority Data

Oct. 17, 2001  (EP)  ................................. 01308821

(51) Int. Cl.
*H01M 8/04*  (2006.01)

(52) U.S. Cl. ........................ 429/14; 429/26; 429/120; 252/68; 252/78; 165/58; 174/15.1

(58) Field of Classification Search .................. 252/68, 252/79; 429/26, 120, 14; 165/58; 174/15.1
See application file for complete search history.

(56) References Cited

U.S. PATENT DOCUMENTS

| 4,851,145 A | * | 7/1989 | Van Neste et al. ............. 252/75 |
| 5,366,651 A | * | 11/1994 | Maes et al. .................... 252/76 |
| 5,997,763 A | | 12/1999 | Pabon, Jr. et al. | |

FOREIGN PATENT DOCUMENTS

| DE | 196 24 519 | | 1/1998 |
| EP | 0 564 721 B1 | | 4/1997 |
| EP | 0 995 785 A1 | | 4/2000 |
| JP | 2001 164244 | | 6/2001 |
| WO | 00/17951 | * | 3/2000 |
| WO | WO 00/17951 | | 3/2000 |

* cited by examiner

*Primary Examiner*—Lorna M. Douyon
*Assistant Examiner*—Amina Khan
(74) *Attorney, Agent, or Firm*—Steven R. Ellinwood

(57) ABSTRACT

The invention relates to a method for cooling an electrical system comprising circulating in a cooling system of the electrical system a mixture comprising a heat transfer fluid and one or more carboxylic acid salts thereof, wherein the electrical conductivity of the mixture is less than 100 μS/cm.

21 Claims, 2 Drawing Sheets

METHODS FOR FUEL CELL COOLANT SYSTEMS

This application is a 35 U.S.C. §371 national stage filing of PCT/EP02/11497 filed Oct. 15, 2002.

BACKGROUND OF THE INVENTION

1. Field of the Invention

This invention relates to fuel cell coolant compositions with good corrosion inhibiting properties and low electrical conductivities, and to their use to inhibit corrosion in fuel cells.

2. Description of Related Art

Fuel cells are electrochemical cells in which the chemical energy stored in a fuel source is converted to electrical energy by controlled oxidation of the fuel. In principle a fuel cell operates like a battery. However, unlike a battery, a fuel cell does not run down or require recharging. It will produce energy in the form of electricity and heat as long as fuel is supplied. A fuel cell consists of two electrodes sandwiched around an electrolyte. For example, in a proton exchange membrane fuel cell, gaseous hydrogen ($H_2$) is supplied to the anode, usually a porous metal plate which acts as a catalyst for the oxidation reaction. An oxygen ($O_2$) source, which can be simply air, is supplied to the cathode, which is also usually a porous metal plate. The electrodes (i.e., the anode and cathode) are, as noted, separated by an electrolyte, an ionically conductive material through which ions can flow from the anode to the cathode. In the case of a proton exchange membrane fuel cell, the electrolyte is split by a thin solid polymer sheet that is permeable to protons (i.e. hydrogen ions, $H^+$). At the anode, a hydrogen molecule dissociates to release two electrons and two protons i.e.

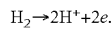

$$H_2 \rightarrow 2H^+ + 2e.$$

The protons and the electrons produced by this reaction travel from the anode, where they were made, through the membrane to the cathode, where they are used up in the reduction of oxygen:

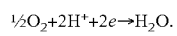

$$\tfrac{1}{2}O_2 + 2H^+ + 2e \rightarrow H_2O.$$

The electrons can do useful electrical work on their way from the anode to the cathode if a load is placed across the electrodes to complete the circuit, and produce energy. Thus, the products of proton exchange membrane fuel cells are electrical energy and water. The relatively low output of pollutant products compared to the output of pollutant products from combustion processes make fuel cells attractive alternatives in applications including environmentally friendly automobiles and power plants. Notably, proton exchange membrane or "PEM" fuel cells are now found in the propulsion systems of most prototype fuel cell cars and buses.

The electrical potential (voltage) of a fuel cell is determined by the electrochemical potentials of the fuels and oxidants used in the fuel cell, and the total current available from a fuel cell is determined by the total surface area of the electrodes. Many single electrochemical cells can be stacked together in series in order to generate greater voltages, and the resulting greater number of electrodes and consequent greater electrode surface areas also allow greater currents than a single cell. The potential difference between the cathode and anode on the first and last cells (the positive and negative ends of the stack, respectively) is roughly equal to the number of cells in the stack multiplied by the voltage of each cell. The stack can consist of hundreds of individual PEM fuel cells assembled together to produce enough electricity from the chemical reaction of oxygen and hydrogen to run a car or bus.

In a fuel cell stack, the individual fuel cells are separated by plates made of an electrically conductive material such as carbon, and these separator plates are electrically connected. Heat generated by the fuel cell stack can be removed by flowing water or other fluids through channels in the separator plates between the cells. These often ionically conductive coolant fluids, such as glycol, are directed through a conduit that is manifolded to pass through separator plates in parallel, where they are collected at the other side of the cells. The heat of a cell stack may cause the fluids to vaporize, and the vapor may be condensed elsewhere in the fuel cell system. Alternatively, the heat absorbed by the fluids may simply be radiated out to the surrounding environment, and the fluids recirculated through the stack.

The potential difference between the positive and negative ends of the fuel cell stack tends to cause a shunt current to flow through the cooling fluid, thus reducing the voltage of the fuel cell. In addition to the deleterious loss of voltage, shunt currents create the additional problem of causing the separator plate nearest the positive end of a fuel cell stack to corrode with time. Thus, there is a need in the art for fuel cell coolants that have superior electrical resistance in order to prevent shunt currents from reducing the fuel cell potential and to reduce corrosion of fuel cell separator plates while maintaining good heat conductivity so that they are useful as fuel cell coolants.

Fuel cells have been studied as power sources for automobiles. However, in order for this application to be practical, the fuel cells must be able to start even in freezing weather. Thus there is also a need in the art for fuel cell coolants that have low freezing point temperatures.

SUMMARY OF THE INVENTION

The invention involves compositions with high thermal conductivities that are especially suited for applications that would benefit from dielectric fluids, such as fuel cell cooling applications, as well as battery packs and other electrical or electronic systems because of their surprisingly low electrical conductivities. These compositions also benefit from having freezing points below that of water. The invention includes methods of preventing corrosion in fuel cells by using these compositions as fuel cell coolants.

In one aspect, the invention involves compositions comprising one or more carboxylic acid salts, preferably the amine or ammonium salts selected from $C_5$–$C_{18}$ mono- or di-carboxylic acids. Preferred compositions additionally comprise a hydrocarbyl triazole and/or thiazole or a combination of one or more hydrocarbyl triazoles and/or thiazoles to improve corrosion protection and to remove metal ions and ionic contaminants that would otherwise increase the compositions' electrical conductivities. This specification recites carboxylic acids both generically and specifically throughout; however, unless specifically stated otherwise, the terms 'carboxylic acid' and specific carboxylic acids such as '2-ethylhexanoic acid' are intended to encompass not only the acids per se, but also any acceptable salts of said acids. Acceptable salts of said acids include, but are not limited to, the alkali metal, ammonium, and amine salts of said acids.

The compositions additionally comprise aqueous or nonaqueous heat-transfer fluids that have low electrical conductivity. A preferred fluid is water and the most preferred fluids are aqueous fluids containing liquid alcohol freezing point depressants because they offer the benefit of allowing operation at temperatures below freezing.

A major advantage of the present invention is that low electrical conductivities can be achieved in aqueous solutions or solutions of glycol and water or other alcohol solutions. This is achieved in combination with heat-transfer, freezing protection and corrosion protection properties that are comparable or better than those of conventional coolants and heat transfer fluids which typically have high electrical conductivities. Improved heat-transfer is also achieved when compared to hydrocarbon or polymer based heat-transfer fluids. The aqueous fluids of the current invention also have the surprising advantage of low flammability. This is important in an electrical environment. The fluids are also less toxic and are relatively harmless to the environment compared to hydrocarbon or other coolants used in these applications.

PRIOR ART

Organic Acid Technology (OAT) coolants and heat-transfer fluids are well known in the art for providing improved corrosion protection. The coolants and fluids also have a long life and can be left in situ for a considerable period of time. OAT corrosion-inhibitor packages in aqueous glycol concentrates are well known for use in automotive, heavy duty, marine and industrial applications. OAT corrosion-inhibitors are also used in secondary cooling systems and in a variety of industrial heat-transfer fluids. Several US and other patent references disclose the use of carboxylic acids, or the salts of such acids, as corrosion-inhibitors in antifreeze/coolant and heat-transfer fluid compositions. These compositions are often optimized for the protection of aluminium and other materials currently used in the above applications, e.g. in engine blocks.

Various corrosion inhibitors have been added to heat-transfer fluids to reduce corrosion of metallic systems. For example, U.S. Pat. No. 4,587,028 (Darden) discloses non-silicate anti-freeze formulations containing alkali metal salts of benzoic acid, dicarboxylic acid and nitrate. Additional ingredients including alkali metal hydroxides, alkali metal nitrates and aromatic triazoles, such as tolyltriazole or benzotriazole are preferably provided. U.S. Pat. No. 4,647,392 (Darden et al) discloses corrosion inhibitors using aliphatic monobasic acids or salts, hydrocarbyl dibasic acids or salts and hydrocarbonyl triazole. U.S. Pat. No. 4,657,689 (Darden) discloses corrosion inhibitors containing aliphatic monobasic acids or salts, hydrocarbyl dibasic acids or salts, hydrocarbyl azoles and specific hydrocarbyl alkali metal sulfonates. U.S. Pat. No. 5,085,791 (Burns) discloses antifreeze compositions containing cyclohexane acid corrosion inhibitor alone or in combination with other corrosion inhibitors, particularly sebacic acid and tolyltriazole. The cyclohexane acid includes cyclohexyl carboxylic (formic) acid, cyclohexyl acetic acid and cyclohexyl propionic acid. The cyclohexane acid is targeted to inhibit lead solder and/or aluminium corrosion.

Engine and heat exchanger manufacturers are now evaluating the use of magnesium as a material for engine and heat-transfer systems. These materials are also considered for fuel cell heat exchange systems and for systems requiring low electrical conductivity. In general, currently used OAT coolants provide adequate corrosion protection for aluminium and are only mildly aggressive to magnesium. However, the protection levels for magnesium are not sufficient, particularly at high temperature.

EP-A-0995785 (Maes et al) describes a select group of aliphatic and aromatic carboxylic acids that provide corrosion protection for aluminium and magnesium alloys. Aliphatic carboxylic acids that provide good aluminium and magnesium protection may be any $C_{5-15}$ aliphatic monobasic acid or dibasic acid or the alkali metal, ammonium or amine salt of said acids. Preferred monobasic acids include one or more of the following acids or isomers thereof: heptanoic acid, octanoic acid, and nonanoic acid, and mixtures thereof. Decanoic acid and undecanoic acid also provide good protection. Of the dibasic acids, dodecanedioic acid provides good magnesium protection. Of the naphtylcarboxylic acids, 1-naphtylcarboxylic acid is the preferred acid. Amongst the aromatic carboxylates, the group of alkylbenzoic acids of general formula I

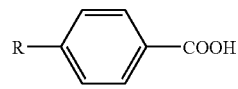

I is preferred, where R is a $C_1$–$C_8$ alkyl radical. 4-tert-butylbenzoic acid is preferred. Of the naphtylcarboxylic acids, 1-naphtylcarboxylic acid is the preferred carboxylic acid.

The combination of one or more of the above-described acids gives a synergistic effect for magnesium protection. The combination of tert-butyl-benzoic acid (PTBBA) and octanoic acid is especially preferred. Nonanoic and heptanoic acid are good alternatives for octanoic acid. The addition of a hydrocarbyl triazole to these combinations provides additional copper protection, as expected. Improved corrosion protection properties is also found for the other metals, especially for aluminium.

FIGURES

The present application will be described in more detail with reference to the accompanying figures, wherein.

DETAILED DESCRIPTION OF THE INVENTION

The present invention relates to applications where low electrical conductivity is a requirement. In particular, a corrosion inhibitor and heat-transfer fluid is described for use in heat-transfer applications requiring good thermal conductivity combined with low electrical conductivity. Examples of applications are: fuel cell systems, electric motors, generators, battery packs, telephone transmission stations, radio and television broadcast stations, relay stations, electrical heating and cooling devices, and other electrical or electronic tools or equipment requiring cooling or heat-transfer. The corrosion inhibitor comprises one or more carboxylic acids or carboxylic acid salts, selected from $C_5$–$C_{18}$ monocarboxylic and/or dicarboxylic acids or aromatic carboxylic acids or mixtures thereof. Preferably the amine salts of the carboxylic acids are selected. This includes one or more of the following acids or isomers thereof: hexanoic, heptanoic, isoheptanoic, octanoic, 2-ethylhexanoic, nonanoic, decanoic, undecanoic, dodecanoic, neodecanoic and cyclohexylbutylic acid. Octanoic and 2-ethylhexanoic acids are preferred for use in this invention.

The carboxylic acid may be an aromatic monobasic acid, e.g. an alkylbenzoic acid of formula I

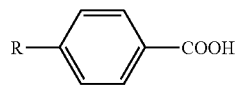

where R is a $C_1$–$C_8$ alkyl radical. 4-tert-butylbenzoic acid (PTBBA) is preferred.

The carboxylic acid may be a $C_5$–$C_{18}$ aliphatic dibasic acid, such as suberic, alezeic, sebacic, undecanedioic, dodecanedioic, the diacid of dicyclopentadiene or terephthalic acid or mixtures thereof.

Combinations of acids may be used, e.g. combinations of monobasic and dibasic acids as described above.

Figure 1:
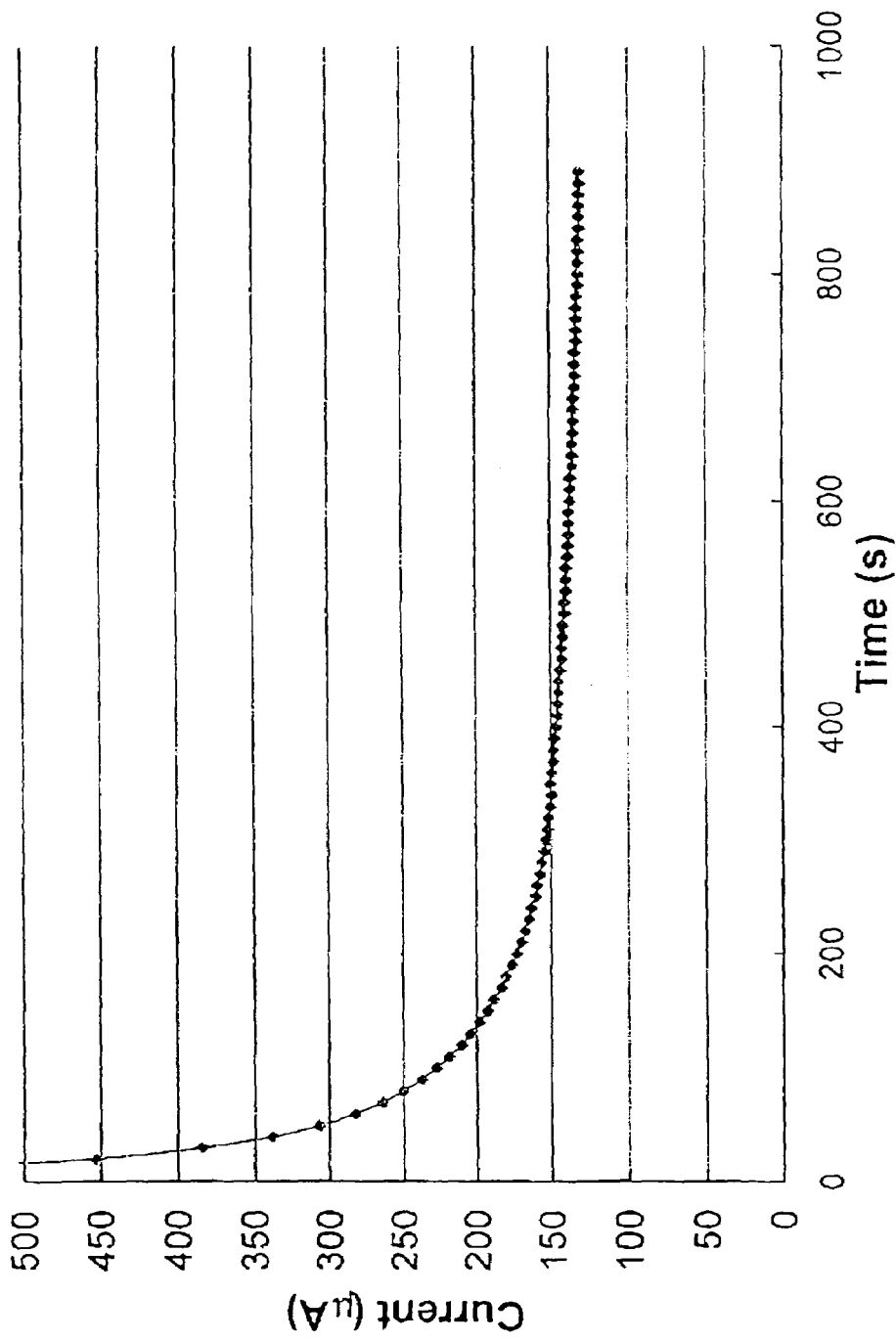
FIG. 1 shows polarisation effects for a highly conductive organic acid coolant, demonstrating reduced current flow with time between the anode and cathode of a fuel cell stack due to polarisation through the surface action of the carboxylate inhibitors.

The base fluid influences electrical conductivity. Traditionally, hydrocarbon or polymer based freezing point depressants and fluids with low electrical conductivity have been used in applications requiring low electrical conductivity. Aqueous fluids and aqueous liquid alcohol dilutions have the advantage of providing good heat-transfer properties compared to these hydrocarbon or polymer based freezing point depressants. The disadvantage of these alcohol fluids is high electrical conductivity. However, carboxylic acid inhibitors, as used in known coolants, have been found to provide polarisation which has the effect of reducing current flow between the anode and cathode in an electrical system as for instance a fuel cell stack. This reduction in current flow is shown in FIG. 1. In such fluids the corrosion inhibitors are major contributors to ionic conductivity. To improve the reduction in electrical conductively it has been found that selection of the carboxylate inhibitor and neutralisation cation is important. For instance, neutralisation of the carboxylic acids with sodium hydroxide provides a 20 to 30% reduction in electrical conductivity compared to neutralisation with potassium hydroxide. Table 1 shows how different bases were used to neutralise the various carboxylic acids. Neutralisation of the carboxylic acids with amines results in a 50 to 60% reduction in electrical conductivity and is particularly preferred. The use of triethanolamine, morpholine and n-octylamine are preferred from the Examples. This table shows how the use of sodium hydroxide is preferred to potassium hydroxide as the neutralising base.

Figure 2:
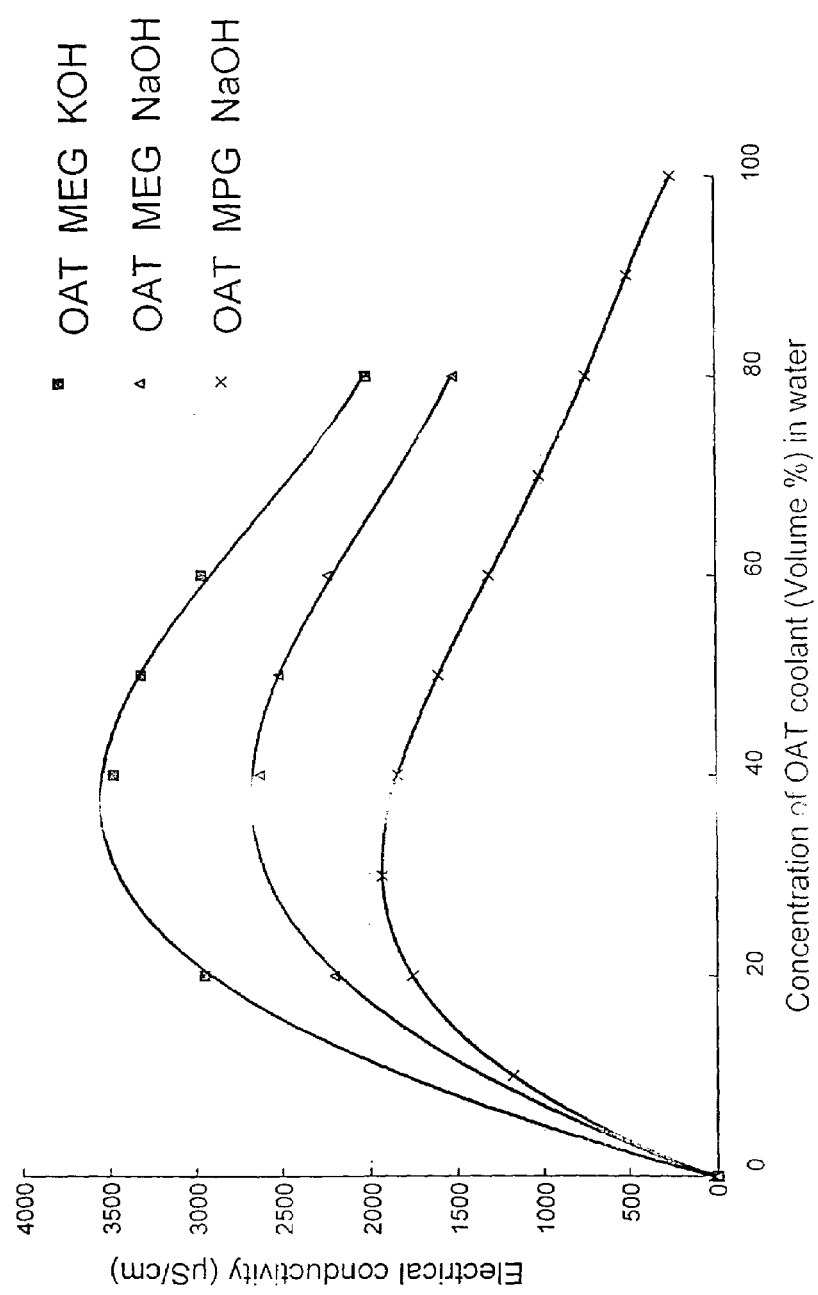
FIG. 2 illustrates the electrical conductivity of an organic acid coolant using different neutralising bases and different liquid alcohol freezing point depressants.

The carboxylic acids (or salts) may be dissolved and used in water alone. However, the carboxylic acid fuel cell coolant concentrates are preferably dissolved in a major amount, most preferably 90–99 weight percent of a water soluble liquid alcohol freezing point depressant, preferably ethylene glycol or propylene glycol to form a corrosion-inhibiting fuel cell coolant concentrate. Other liquid alcohol freezing point depressants that may be used to form the concentrates of the present invention include diethylene glycol, propylene glycol, dipropylene glycol, and glycol monoethers, such as the methyl, ethyl, propyl, and butyl ethers of ethylene glycol, diethylene glycol, propylene glycol, and dipropylene glycol. Coolant or heat-transfer fluid made with ethylene glycol (MEG) coolant is more conductive then coolant made using a propylene glycol (MPG) base. With the same inhibitor system a reduction of 20 to 30% in electrical conductivity is observed using a propylene glycol compared to an ethylene glycol based coolant. This is also shown in FIG. 2, and later in Table 4.

TABLE 1

Influence of cation on electrical conductivity

| EXAMPLE | | Formulation of concentrate in monoethylene glycol (MEG) | Neutralized by Base | pH at 33 % Vol. | Conductivity (μS/cm) at 60% Vol. |
|---|---|---|---|---|---|
| Comparative A | | MEG + 1% Octanoic acid | KOH | 7.34 | 828 |
| Invention 1 | a | MEG + 1% Octanoic acid | NaOH | 7.42 | 637 |
| | b | | LiOH | 7.43 | 559 |
| | c | | TEA | 7.36 | 383 |
| | d | | Pyridine | — | 478 |
| | e | | Morpholine | 7.15 | 478 |
| | f | | n-Octylamine 99+% | 7.23 | 336 |
| Comparative B | | MEG + 1% Octanoic acid + 0.2% TTZ | KOH | 7.03 | 829 |
| Invention 2 | a | MEG + 1% Octanoic acid + 0.2% TTZ | NaOH | 7.06 | 641 |
| | b | | LiOH | 7.06 | 463 |
| | c | | TEA | 7.36 | 391 |
| | d | | Pyridine | — | — |
| | e | | Morpholine | 7.04 | 481 |
| | f | | n-Octylamine 99+% | 7.08 | 325 |
| Comparative C | | MEG + 1% Benzoic acid | KOH | 7.37 | 1015 |
| Invention 3 | a | MEG + 1% Benzoic acid | NaOH | 7.09 | 760 |
| | b | | LiOH | 7.15 | 585 |
| | c | | TEA | 7.26 | 485 |
| | d | | Pyridine | — | — |
| | e | | Morpholine | 7.27 | 604 |
| | f | | n-Octylamine 99+% | 7.26 | 470 |
| Comparative D | | MEG + 1% 2-EHA | KOH | 7.2 | 799 |
| Invention 4 | a | MEG + 1% 2-EHA | NaOH | 7.2 | 634 |
| | b | | LiOH | 7.07 | 452 |
| | c | | TEA | 7.26 | 371 |
| | d | | Pyridine | 6.01 | 325 |

TABLE 1-continued

Influence of cation on electrical conductivity

| EXAMPLE | | Formulation of concentrate in monoethylene glycol (MEG) | Neutralized by Base | pH at 33 % Vol. | Conductivity (μS/cm) at 60% Vol. |
|---|---|---|---|---|---|
| | e | | Morpholine | 7.05 | 469 |
| | f | | n-Octylamine 99+% | 7.1 | 346 |
| Comparative E | | MEG + 1% Sebacic acid | KOH | 7.82 | 1188 |
| Invention 5 | a | MEG + 1% Sebacic acid | NaOH | 7.07 | 866 |
| | b | | LiOH | 7.32 | 675 |
| | c | | TEA | 7.36 | 560 |
| | d | | Pyridine | — | — |
| | e | | Morpholine | 7.14 | 699 |
| | f | | n-Octylamine 99+% | 7.16 | 504 |
| Comparative F | | MEG + 1% cyclohexyl butyric acid | KOH | 7 | 680 |
| Invention 6 | a | MEG + 1% cyclohexyl butyric acid | NaOH | 7.52 | 514 |
| | b | | LiOH | 7.17 | 374 |
| | c | | TEA | 7.31 | 309 |
| | d | | Pyridine | — | 636 |
| | e | | Morpholine | 7.22 | 336 |
| | f | | n-Octylamine 99+% | 7.15 | 230 |

Surprisingly coolants and heat-transfer fluids according to the present invention also provide good corrosion protection. Low electrical conductivity fluids (<100 μS/cm) were blended containing only a small amount of amine neutralised $C_{5-C18}$ carboxylic acid inhibitors. It was found that these fluids provide sufficient system corrosion protection as verified in comparative glassware corrosion tests and dynamic heat-transfer tests. Table 2 shows the results of glassware corrosion tests of various examples of the invention, compared to a commercial OAT coolant under identical conditions (33% volume coolant in water, 88° C., 14 days). The formulation of Example 7, containing the tri-ethanolamine (TEA) salt of octanoic acid (OA), provides good corrosion protection even at a very low inhibitor dosage (500 ppm). Example 8 with 4-tert-butylbenzoic acid (PT-BBA) and Examples 9 and 10, containing dodecanedioic acid (DDDA) provide good protection at low concentration when neutralised with TEA or morpholine. Improved corrosion protection for magnesium is found. In Table 2, the electrical conductivities of the fluids at 60% volume concentration in water is shown Combinations of the amine salts of the described acids can be used to further optimise corrosion protection properties. Optionally a hydrocarbyl triazole, a hydrocarbyl thiazole or a combination of one or more hydrocarbyl triazoles and/or hydrocarbyl thiazoles is added to further improve corrosion protection.

The hydrocarbyl triazole component described fuel cell coolant composition is preferably an aromatic triazole or alkyl-substituted aromatic triazole, preferably benzotriazole or tolyltriazole. The most preferred hydrocarbyl triazole is tolyltriazole. The triazole component of this fuel cell coolant composition may be present in a concentration of 0.001–1.0 weight percent, preferably 0.1–0.3 weight percent, based upon the total weight of the concentrate composition. The hydrocarbyl triazoles, thiazoles and other complexing agents are useful in removing metal ions and ionic contaminants that interfere with low electrical conductivity. Metal ions and other contaminant ions in solution will react with the triazoles or thiazoles to form insoluble complexes. In precipitated complex form the metals or contaminants no longer contribute to ionic conductivity.

TABLE 2

Comparison of corrosion properties

Glassware Corrosion test results (mg/coupon)
Formulation of concentrate in monoethylene glycol (MEG)

| | EXAMPLE Comparative G COMMERCIAL OAT COOLANT | EXAMPLE Invention 7 0.1% TTZ + 1% TEA + 500 ppm OA | EXAMPLE Invention 8 0.1% TTZ + 1% TEA + 500 ppm PTBBA | EXAMPLE Invention 9 0.1% TTZ + 1% TEA + 500 ppm DDDA | EXAMPLE Invention 10 0.1% TTZ + 1% morpholine + 500 ppm DDDA |
|---|---|---|---|---|---|
| brass | 2.2 | 1.5 | 1.6 | 1.1 | 0.5 |
| copper | 1.7 | 1.3 | 1.2 | 1.1 | 1.1 |
| solder cb | 9.5 | 7 | 4.9 | 2.5 | −19.2 |
| carbon steel | −0.1 | 0.1 | 0 | 0 | 0.1 |
| cast iron | −0.5 | 0.5 | 2.3 | 0 | 0.3 |
| cast aluminum | 4.4 | −1.7 | −2.5 | −0.8 | −0.6 |
| magnesium | 350.8 | 27.9 | 15.8 | 20 | −29.8 |
| Electrical Conductivity (μS/cm) at 60% Vol. | 2300 | 41 | 39 | 46 | 83 |

One or more optional conventional corrosion inhibitors may also be employed in admixture with the corrosion-inhibiting fuel cell coolant composition of this invention. Preferred conventional corrosion inhibitors are selected for having low electrical conductivity. Preferred conventional corrosion inhibitors include alkali metal hydroxides, ammonium or amine salts of benzoates, silicates, nitrates, molybdates, and mixtures thereof. Such conventional corrosion inhibitors, if employed, are typically present in a concentration of 0.001–5.0 weight percent, based on the total weight of the concentrate composition.

As described in EP-A-0,564,721, it has been found that excellent pH control and buffer capacity near neutral pH is provided when using combinations of amine neutralized aliphatic acid corrosion inhibitors and imidazole or imidazole derivatives. Reserve alkalinity, reserve acidity and pH are easily controlled by either modifying the amount of neutralisation of the acids and/or the imidazole content. The addition of imidazole assists in the pH control. Ammonia or amine may be added to adjust the pH of the composition to the desired level. The formulations according to the present invention are simple to blend to a near neutral pH range, which is an added benefit when using the formulations as fuel cell coolants.

To further evaluate the corrosion protection afforded by the amine carboxylate, low electrical conductivity fluids of this invention, the fluids of Examples 7 and 9 noted above were further evaluated for high temperature aluminium protection in dynamic heat transfer tests. Heat fluxes of respectively 50 W/cm$^2$ and 100 W/cm$^2$ were used. The test duration was 48 hours.

TABLE 3

High temperature aluminum protection
Dynamic heat-transfer tests

| EXAMPLE | | Heat input W/cm2 | Coolant Vol. % | Weight loss heated coupon mg/coupon |
|---|---|---|---|---|
| Invention 7 | Amine carboxylate | 50 | 20 | 9.3 |
| Comparative G | OAT coolant | 50 | 20 | 55 |
| Comparative H | Hybrid coolant | 50 | 20 | 210 |
| Comparative I | Traditional European Coolant | 50 | 20 | 320 |
| Invention 9 | Amine carboxylate | 100 | 20 | −3 |
| Comparative G | OAT coolant | 100 | 20 | 45 |
| Comparative H | Hybrid coolant | 100 | 20 | 308 |
| Comparative I | Traditional European Coolant | 100 | 20 | 329 |
| Comparative J | Traditional US Coolant | 100 | 20 | 626 |

Compared to the commercially available OAT coolant (comparative example G), the commercially available hybrid coolant containing organic acids and traditional inhibitors (comparative example H), the traditional European coolant (comparative example 1) containing borax-benzoate-nitrite-nitrate-silicate inhibitors and the traditional US coolant (comparative Example J) containing phosphates, the amine carboxylate inhibitor containing low conductivity fluids of Invention examples 7 and 9 show low corrosion rates expressed as weight loss in mg per coupon.

The effect on electric conductivity of a change in base fluid from ethylene glycol (MEG) to propylene glycol (MPG) is shown in Table 4 for different concentrations of the glycol in water. A significant reduction in electric conductivity is observed for the propylene glycol based coolant in comparison with ethylene glycol coolant containing an identical inhibitor package. The normal operation range to cover useful freezing protection for glycol based freezing point depressants varies from 30 to 70 volume % of the concentrated heat-transfer fluid in water in order. At 50 volume % concentration an electrical conductivity <20 μS/cm can be obtained in MPG based coolant.

TABLE 4

Effect of base fluid on electrical conductivity

| Coolant concentration Vol. % in water | EXAMPLE Invention 11 MEG + 0.1% TTZ + 250 ppm DDDA + 0.5% TEA Conductivity μS/cm | EXAMPLE Invention 12 MPG + 0.1% TTZ + 250 ppm DDDA + 0.5% TEA Conductivity μS/cm |
|---|---|---|
| 0 | 0.86 | 0.86 |
| 10 | 26.8 | 23.1 |
| 20 | 41.9 | 30.4 |
| 30 | 47.9 | 29.9 |
| 40 | 48.9 | 25.75 |
| 50 | 42 | 19.35 |
| 60 | 36.8 | 15.33 |
| 70 | 30.1 | 11.14 |
| 80 | 23.19 | 7.49 |
| 90 | 16.9 | 4.52 |
| 100 | 12 | 2.21 |

Preferred Embodiments

The corrosion inhibitor can be added to aqueous or non-aqueous heat-transfer fluids that have low electrical conductivity.

In a preferred embodiment of the instant invention, the above described corrosion inhibitors are employed in a mixture with a liquid alcohol freezing point depressant to form an antifreeze/coolant concentrate composition for use in the cooling systems where low electrical conductivity is a requirement. The coolant concentrate composition comprises: from 0.01 to 99.99 weight percent of a water soluble liquid alcohol freezing point depressant, preferably 90 to 99 weight percent, and from 0.001–1, preferably 0.01–0.05 weight percent of the above described carboxylic acid corrosion inhibitor component, preferably neutralised with an amine base. In addition hydrocarbyl triazole and/or thiazole components can optionally be used in concentrations ranging from 0.001–1, preferably 0.1–0.3 weight percent.

The liquid alcohol freezing point depressant component of the above described coolant in the present invention include glycols such as ethylene glycol, di-ethylene glycol, propylene glycol, di-propylene glycol and glycol monoethers such as the methyl, ethyl, propyl and butyl ethers of ethylene glycol, di-ethylene glycol, propylene glycol and di-propylene glycol. Ethylene and propylene glycol are particularly preferred as the freezing point depressant component. Propylene glycol is preferred when very low electrical conductivity is required.

In another embodiment of the invention, the above described corrosion inhibited coolant concentrate composition is diluted with 10–90 volume percent, preferably 30–70 volume percent of water. In yet another embodiment of the invention, the above described corrosion inhibitor combinations are used in aqueous solutions when freezing point is not a requirement. In yet another embodiment of the invention, the above described corrosion inhibitor combinations are used to provide corrosion protection in hydrocarbon or polymer based freezing point depressants or solutions thereof.

The invention claimed is:

1. A method for cooling an electrical system comprising circulating in a cooling system of said electrical system a mixture comprising a heat transfer fluid and one or more carboxylic acids or salts thereof, wherein the electrical conductivity of said mixture is less than 100 μS/cm.

2. The method of claim 1 wherein the carboxylic acid is a $C_5$–$C_{18}$ mono- or di-carboxylic acid.

3. The method of claim 1 or claim 2 wherein the carboxylic acid is selected from the group consisting of hexanoic, heptanoic, isoheptanoic, octanoic, 2-ethylhexanoic, nonanoic, decanoic, undecanoic, dodecanoic, neodecanoic and cyclohexyl butylic acid and isomers thereof.

4. The method of claim 1 or claim 2 wherein the carboxylic acid is an alkylbenzoic acid of formula I

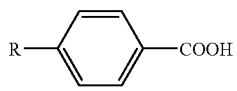

I where R is a $C_1$–$C_8$ alkyl radical.

5. The method of claim 1 or claim 2 wherein the carboxylic acid is selected from the group consisting of suberic, alezeic, sebacic, undecanedioic, dodecanedioic, the diacid of dicyclopentadiene or terephthalic acid, and isomers thereof.

6. The method of claim 1 wherein the carboxylic acid is present as the salt of an alkali metal hydroxide.

7. The method of claim 6 wherein the salt is the salt of sodium hydroxide.

8. The method of claim 7 wherein the salt is an ammonium or amine salt.

9. The method of claim 8 wherein the salt is selected from the group consisting of ethanolamine, morpholine and n-octylamine salts.

10. The method of claim 1 or 2 wherein the carboxylic acid or salt thereof is dissolved in a water soluble liquid alcohol freezing point depressant.

11. The method of claim 10 wherein the water soluble liquid alcohol freezing point depressant is a glycol.

12. The method of claim 11 wherein the glycol is selected from the group consisting of diethylene glycol, propylene glycol, dipropylene glycol, the methyl, ethyl, propyl, and butyl ethers of ethylene glycol, diethylene glycol, propylene glycol, and dipropylene glycol.

13. The method of claim 11 wherein the water soluble liquid alcohol freezing point depressant is monoethylene glycol.

14. The method of claim 10 wherein from 0.001 to 10 wt. % of the carboxylic acid or a salt thereof is dissolved in from 90–99 wt. % of the liquid alcohol freezing point depressant.

15. The method of claim 1 or 2 wherein a hydrocarbyl triazole, a hydrocarbyl thiazole or a combination thereof is added to the concentrate composition.

16. The method of claim 15 wherein the triazole and/or thiazole is added to a concentration of 0.001 to 0.5 wt. %, based on the total weight of the concentrate composition.

17. The method of claim 1 or 2 wherein the concentrate composition further comprises one or more corrosion inhibitors selected from the group consisting of alkali metal hydroxides, ammonium salts of benzoates, silicates, nitrates, molybdates, amine salts of benzoates, silicates, nitrates, molybdates and mixtures thereof.

18. The method of claim 17 wherein the corrosion inhibitor is added to a concentration of 0.001 to 5.0 wt. %, based on the total weight of the concentrate composition.

19. The method of claim 1 or 2 wherein the concentrate composition is diluted with 10–90 volume percent of water.

20. The method of claim 1 or 2 wherein the concentrate composition is diluted with 30–70 volume percent of water.

21. The method of claim 1 wherein the electrical system comprises a plurality of fuel cells.

* * * * *